April 10, 1934.  L. P. SHILDNECK  1,954,683
FIELD WINDING FOR DYNAMO ELECTRIC MACHINES
Filed Dec. 5, 1931   3 Sheets-Sheet 1
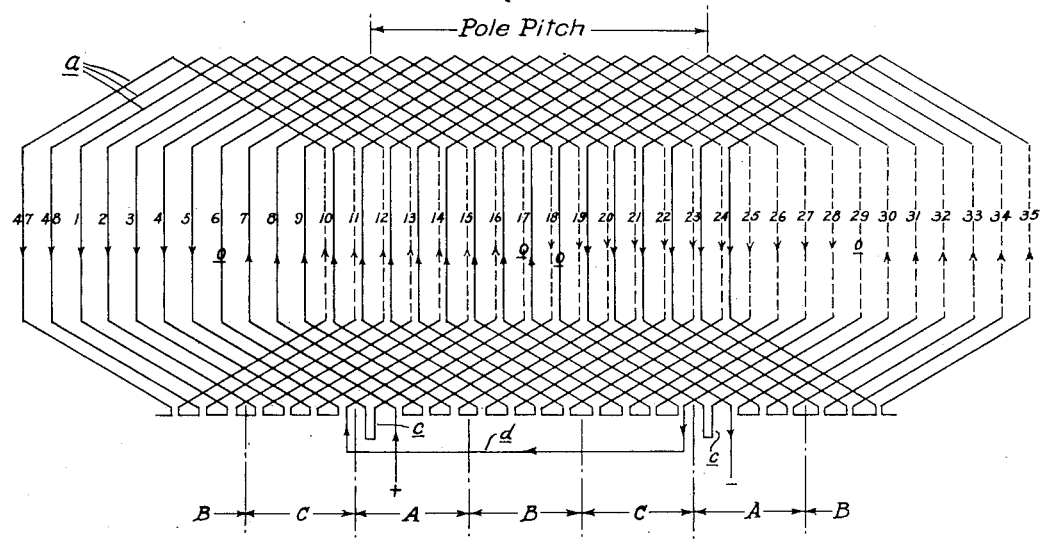
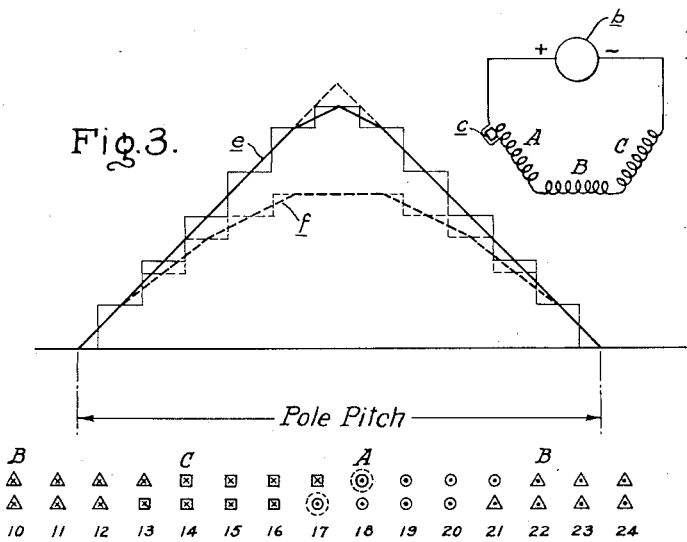
Inventor
Lloyd P. Shildneck
by Charles V. Tullar
His Attorney.

April 10, 1934.  L. P. SHILDNECK  1,954,683
FIELD WINDING FOR DYNAMO ELECTRIC MACHINES
Filed Dec. 5, 1931  3 Sheets-Sheet 2
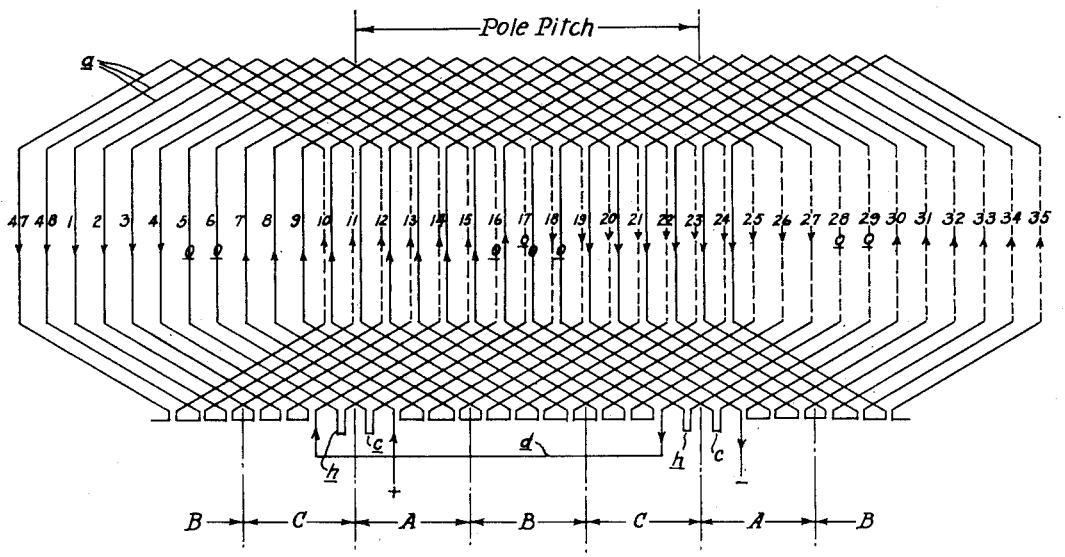
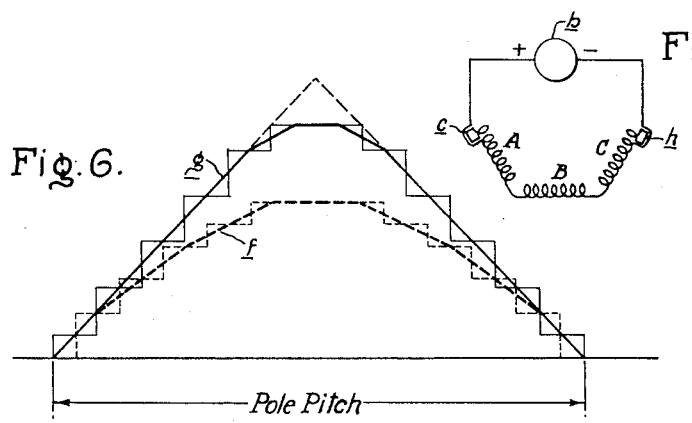

April 10, 1934.  L. P. SHILDNECK  1,954,683
FIELD WINDING FOR DYNAMO ELECTRIC MACHINES
Filed Dec. 5, 1931  3 Sheets-Sheet 3
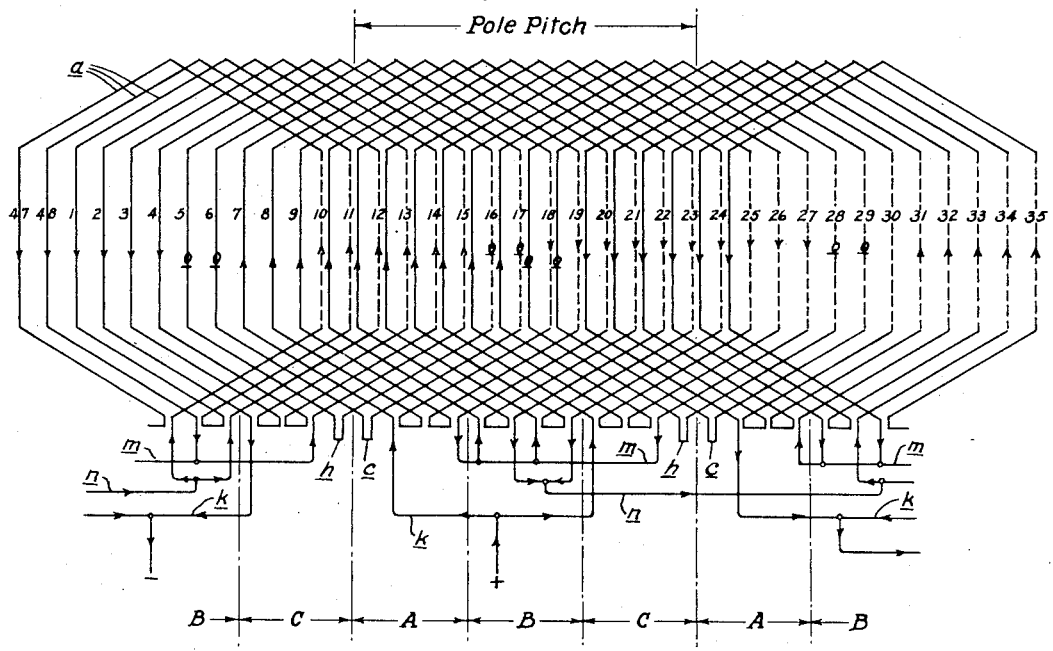
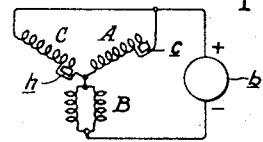
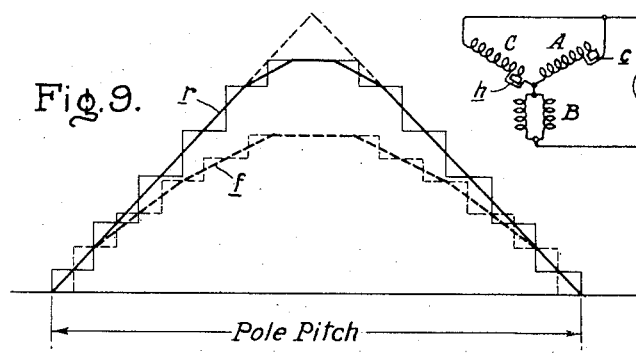
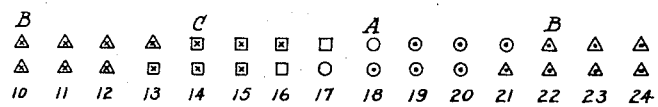
Inventor
Lloyd P. Shildneck
by Charles E. Tullar
His Attorney.

Patented Apr. 10, 1934

1,954,683

UNITED STATES PATENT OFFICE 1,954,683

FIELD WINDING FOR DYNAMO-ELECTRIC MACHINES

Lloyd P. Shildneck, Scotia, N. Y., assignor to General Electric Company, a corporation of New York Application December 5, 1931, Serial No. 579,190

5 Claims. (Cl. 171—206)

My invention relates to an improved arrangement of a multi-layer distributed field winding for dynamo-electric machines.

In the design of field windings of this type for dynamo-electric machines such, for example, as sine wave generators and synchronous induction motors, the winding arrangements heretofore proposed have not been entirely satisfactory because the amount of field flux produced by the windings has been limited by the heating of the windings. Since the heating of the field windings limits the fundamental of the flux wave which the field windings may produce, it is very desirable to provide a field winding arrangement which will produce a substantially sinusoidal flux wave with a minimum amount of excitation current for a given height of fundamental of the flux wave. Furthermore, the winding arrangements heretofore proposed have been undesirable because the excitation power ($I^2R$) losses have not been reduced to a minimum. In a fractional pitch winding of this type, the current in the conductors in certain slots normally flows in opposite directions. In such slots the magnetomotive force is sometimes reduced to zero, although the conductors therein are carrying the same current as the other conductors, which adds to the excitation power loss of the field winding. For this reason, the conductors in certain slots have not been effectively utilized. When a field winding of this type is employed in single-phase alternating current dynamo-electric machines, it is also desirable to have the field windings arranged to neutralize the effects of the backward rotating component of single-phase armature reaction.

It is an object of my invention to provide an improved arrangement of a multiple layer distributed field winding for dynamo-electric machines, which is efficient, produces an improved sinusoidal flux wave, and minimizes heating of the winding for a given height of fundamental of the flux wave. I accomplish this by providing a multiple layer fractional pitch distributed winding which is connected to produce a substantially sinusoidal magnetomotive force wave, and by short-circuiting a portion of at least one layer of the winding which normally produces a magnetomotive force opposing that produced by an adjacent layer.

Another object of my invention is to provide an improved arrangement of a multiple layer distributed field winding for alternating current dynamo-electric machines which serves as a damping winding therefor.

Further objects and advantages of my invention will become apparent as the following description proceeds, and the features of novelty which characterize my invention will be pointed out with particularity in the claims annexed to and forming a part of this specification.

In the drawings Fig. 1 is a developed diagram of a portion of a double layer distributed field winding for a four pole dynamo-electric machine arranged in accordance with my invention; Fig. 2 is a schematic diagram showing the winding connections for one pole of the arrangement illustrated in Fig. 1; Fig. 3 is a curve representing the flux wave produced by the conductors shown below it for one pole pitch of the winding arrangement illustrated in Fig. 1; Figs. 4 and 7 are modifications of the arrangement illustrated in Fig. 1; Figs. 5 and 8 are schematic diagrams showing the winding connections for one pole of the modified arrangements illustrated in Figs. 4 and 7, respectively; and Figs. 6 and 9 are curves representing the flux waves produced by the conductors shown below them for one pole pitch of the modified winding arrangements illustrated in Figs. 4 and 7, respectively.

In the drawings, I have diagrammatically shown my invention in connection with a two layer fractional pitch distributed field winding having a magnetic field member with 48 slots. Referring to Fig. 1, the distributed field winding consists of a number of similar lap wound coils $a$ having a fractional pitch of 11 slots with two coil sides per slot, one above the other. Each coil has one side arranged in the top of a slot and the other side arranged in the bottom of another slot. In Fig. 1 the top conductors are represented by full lines and bottom conductors by dotted lines. The coils $a$ are connected in groups of four coils to form three circuits for each pole pitch of the winding. These circuits are indicated at the end connections of the coils as A, B, and C, with the coil sides or conductors in each circuit distributed among four slots for each pole pitch of 12 slots. Thus, the first A circuit indicated in Fig. 1 includes the coils comprising the top conductors in slots 6, 7, 8, and 9, and bottom conductors in slots 17, 18, 19, and 20, respectively. The second B circuit includes the coils comprising the top conductors in slots 10, 11, 12, and 13, and bottom conductors in slots 21, 22, 23, and 24, respectively. The second C circuit includes the coils comprising the top conductors in slots 14, 15, 16, and 17 and bottom conductors in slot 25, 26, 27, and 28, respectively. The second A circuit includes the coils comprising the top conductors in slots 18, 19, 20 and 21 and bottom conductors in slots 29, 30, 31, and 32, respectively. The conductors in each circuit are indicated by distinguishing marks, as shown in Fig. 3. Thus, the conductors in the A circuits are indicated by circles, the conductors in the B circuits by triangles, and the conductors in the C circuits by squares.

In accordance with my invention the three circuits A, B, and C are connected in series relation to produce a substantially sinusoidal magnetomotive force wave, and certain coils in which the currents in the top and bottom coils, sides or conductors in a slot normally flow in opposite directions to produce opposing magnetomotive forces are short-circuited. This is accomplished, as schematically shown in Fig. 2 for one pole, by connecting the positive terminal of an exciter $b$ to the beginning of circuit A, the end of A to the beginning of B, the end of B to the beginning of C, and the end of C to the negative terminal of the exciter. The first coil of A circuit is short-circuited as diagrammatically indicated at $c$. One pole pitch of the winding between the slots 12 and 23 and adjacent coils is shown in Fig. 1, with the coils in circuits A, B, and C connected in series at the end connections. The positive terminal of the exciter is connected to the second coil in the first A circuit comprising the top conductor in slot 7 and bottom conductor in slot 18, the first coil being short-circuited as indicated at $c$. The lead $d$ is connected to the last coil in the second C circuit comprising the bottom conductor in slot 28 and the top conductor in slot 17. The detailed connections of the circuits have only been shown for one pole pitch of the winding, but it is to be understood that the circuit connections for each pole are the same with the direction of the field current reversed from one group of circuits to the next to obtain the proper polarity of the poles. Thus, the lead $d$ from the circuits described above is connected to the last coil in the first C circuit comprising the bottom conductor in slot 16 and top conductor in slot 5, so that the current will flow in the opposite direction through the adjacent group of circuits comprising the next pole. The negative terminal of the exciter is connected to the coil comprising the top conductor in slot 19 and bottom conductor in slot 30, which is the second coil in the second A circuit in the last group of circuits through which the field current flows, the first coil being short-circuited. The directions of the currents in the conductors are indicated by arrows in Fig. 1, and in Fig. 3 the currents flowing away from the observer are indicated by crosses within the conductors, and the currents flowing toward the observer are indicated by dots.

It is to be noted that in this winding the first coil in each A circuit is short-circuited, as indicated at $c$, to eliminate the effect of certain conductors from the field winding where the currents in the top and bottom conductors in the same slot flow in opposite directions. Referring to Fig. 3, which represents a group of conductors for one pole pitch of the winding in Fig. 1 between the slots 12 and 23, the directions of the currents are shown in the conductors when all of the coils are connected in the field winding. If all of the coils in the first A circuit indicated in Fig. 1 were employed in series, it can be seen that the currents in the top and bottom conductors in the slot 17 would flow in opposite directions. Since the directions of the currents in the top and bottom conductors in slot 17 are such that flux produced by the top conductor assists and the flux produced by the bottom conductor opposes the magnetomotive force wave, it is desirable to short-circuit the coil in the first A circuit comprising the bottom conductor in slot 17 and top conductor in slot 6. Similarly, the first coils of the other A circuits are short-circuited where the slot magnetomotive force would otherwise be zero. Thus, the first coil in the second A circuit indicated in Fig. 1 in the adjacent group of circuits, which comprises the bottom conductor in slot 29 and top conductor in slot 18, is short-circuited. The sides of the short-circuited coils are indicated at $o$ in Fig. 1, and dotted circles in Fig. 3. Short-circuiting certain coils in this manner avoids wasteful excitation power loss of the coils which are not effectively utilized.

In the improved type of winding arrangement just described, the minimum number of coils are short-circuited always to give a magnetomotive force wave having a peaked top, as shown by curve $e$ in Fig. 3. A slightly better wave form is obtained with this improved winding arrangement than the winding arrangements heretofore proposed, because the 5th, 7th, 11th, and 13th harmonics of the magnetomotive force wave are reduced to lower values. Furthermore, the flux produced by the winding is increased approximately 37 per cent, because the fundamental of the flux wave is approximately 37 per cent higher than the fundamental produced by the winding arrangements heretofore proposed for the same value of maximum current. Referring to the magnetomotive force curves shown in Fig. 3, it can readily be seen that the height of the fundamental of curve $e$ obtained by the improved winding arrangement is much greater than curve $f$ obtained by the winding arrangements heretofore proposed, with the same current in the field winding.

The defining equation for this type of winding is $s=(1-p)$, where $s$ is the ratio of short-circuited coils to the total number of coils for each pole, and $p$ is the coil pitch. Taking into consideration the amount of excitation current required, power excitation loss, and coil heating, the most advantageous pitch for the above type of winding has been found to be between 85 and 92 per cent.

An application of the foregoing equation $s=(1-p)$ to the four-pole machine diagrammatically shown in Figs. 1 to 3 is as follows:—This four-pole machine has 48 slots, 48 coils and 4 poles, so that there are 12 coils per pole. The coil sides of each coil as shown in Fig. 1 are 11 slots apart, or 11/12ths of a full pole pitch. Therefore, $p=11/12$ths and $s=(1-p)=1-11/12=1/12$. This indicates that the number of short circuited coils per pole is 1/12 of 12=1.

In Fig. 4 I have shown a modification of the winding arrangement in Fig. 1. In this arrangement the effect of two conductors in the same slot are eliminated from the field winding where the currents in the top and bottom conductors flow in opposite directions. In such slots a zero magnetomotive force is obtained to give a magnetomotive force wave having a flat top, as shown by curve $g$ in Fig. 6. Although the modified arrangement does not have a peaked top as in the arrangement of Fig. 1, the height of the fundamental is approximately 35 per cent higher than obtained by the winding arrangements heretofore proposed for the same value of maximum current. This is clearly shown by a comparison of the curves $f$ and $g$ in Fig. 6. The modified winding arrangement is of considerable value when it is desirable to employ a coil pitch which may not be an advantageous pitch in the winding arrangement shown in Fig. 1.

Referring to Fig. 4, the first coils in the A circuits are short-circuited at $c$, in the same manner as indicated at $c$ in Fig. 1, to eliminate the effect of the bottom conductors in the slots where the currents in the top and bottom conductors flow in opposite directions. In addition to the short-circuited coils in the A circuits, the last coils of the C circuits are also short-circuited, as indicated at $h$, to eliminate the top conductors in the same slots. In the portion of the winding comprising one pole pitch between the slots 11 and 23 and adjacent coils shown in Fig. 4, the short-circuited coil in the second C circuit comprises the top conductor in slot 17 and bottom conductor in slot 28. In the adjacent pole pitch of the winding the short-circuited coil in the first C circuit comprises the top conductor in slot 5 and bottom conductor in slot 16. Similarly, the last coils in the other C circuits are short-circuited to obtain slots having zero magnetomotive force, thus producing a flat top flux wave. The short-circuited conductors are indicated at $o$ in Fig. 4, and without any current flow in Fig. 6. The winding connections for the modified arrangement are the same as shown in the arrangement in Fig. 1, except that the effect of the short-circuited coils $h$ are also eliminated from the winding. Thus, the next to last coil in the second C circuit, which coil comprises the top conductor in slot 16 and bottom conductor in slot 27, is connected by the lead $d$ to the next to last coil in the first C circuit in the adjacent pole, which coil comprises the bottom conductor in slot 15 and top conductor in slot 4.

The defining equation for the modified winding arrangement described above is $s=2(1-p)$, $s$ being the ratio of the short-circuited coils to the total number of coils for each pole, and $p$ being the coil pitch as in the defining equation given for the winding shown in Fig. 1. Taking into consideration the amount of excitation current required, power excitation loss, and coil heating, the most advantageous pitch for this type of winding has been found to be between 91 and 95 per cent. This modified winding arrangement, therefore, is of considerable value when it is desirable to employ a coil pitch higher than 92 per cent. The wave form, excitation current, excitation power loss, and heating of the field winding are approximately the same in both winding arrangements. In the winding arrangement shown in Fig. 1, the value of the fundamental is slightly higher due to the peaked top in the flux wave. At the optimum coil pitches of 93 per cent for the modified winding arrangement and 90 per cent for the winding arrangement shown in Fig. 1, the latter type of winding has about 1.5 per cent less heating, while the former type of winding has slightly better wave form and about 3 per cent less excitation power loss.

In Fig. 7 I have shown a modification of the winding arrangement shown in Fig. 4. In this modified arrangement the effect of two conductors in the same slot are eliminated from the field winding where the currents in the top and bottom conductors normally flow in opposite directions, and the circuits A, B, and C for each pole are Y-connected so that polyphase alternating currents may flow in the field winding to damp out the backward rotating component of single phase armature reaction when the winding is used in a single-phase alternating current machine. In the Y-connected winding arrangements used heretofore, the coils in one of the circuits carried twice as much current as the currents in the other two circuits. In order to avoid this, I divide the B circuits into two parallel circuits, so that all of the coils in the winding, except the short-circuited coils, will carry the same amount of current. This is accomplished, as schematically shown in Fig. 8 for one pole, by connecting the beginning of the circuits A and C to the positive terminal of the exciter $b$, the beginning of the two parallel circuits of B to the ends of both A and C, and the ends of the parallel circuits of B to the negative terminal of the exciter. One pole pitch of the winding between the slots 11 and 23 and adjacent coils is shown in Fig. 7, with the positive terminal of the exciter connected through a leak $k$ to the second coil in the first A circuit comprising the top conductor in slot 7 and bottom conductor in slot 18, and to the first coil in the second C circuit comprising the top conductor in slot 14 and bottom conductor in slot 25. The last coil in the first A circuit comprising the bottom conductor in slot 20 and top conductor in slot 9, and the next to last coil in the second C circuit comprising the bottom conductor in slot 27 and top conductor in slot 16, are connected to a lead $m$ forming the neutral of the Y-connection. From the lead $m$ to the lead $n$ there are two parallel circuits through the coils in the second B circuit. One of these circuits is through the first and second coils comprising the top conductor in slot 10 and bottom conductor in slot 21, and the top conductor in slot 11 and bottom conductor in slot 22. The other of these parallel circuits is through the third and last coils comprising the top conductor in slot 12 and bottom conductor in slot 23, and the top conductor in slot 13 and bottom conductor in slot 24. In this winding arrangement the short-circuited conductors are indicated at $o$ in Fig. 7, and without any current flow in Fig. 9. The detailed connections of the circuits have only been shown for one pole pitch of the winding, but it is to be understood that the circuit connections for each pole are the same with the direction of the field current reversed from one group of circuits to the next to obtain the proper polarity of the poles. Thus, the lead $n$ from the circuits described above is connected so that the field current will flow through the next group of circuits in the opposite direction. The negative terminal of the exciter is connected to the beginning of the A and C circuits through the lead $k$ in the last group of circuits through which the field current flows.

The defining equation for the modified winding arrangement just described is $s=2(1-p)$, which is the same as the defining equation given for the winding shown in Fig. 4, with $s$ being the ratio of the short-circuited coils to the total number of coils for each pole, and $p$ being the coil pitch. In this winding arrangement the same wave shape characteristics are obtained as in the arrangement shown in Fig. 4, as can be seen by comparing curve $r$ in Fig. 9 with the curve $g$ in Fig. 6. The height of the fundamental flux wave is approximately 35 per cent higher in this arrangement than in the winding arrangements heretofore proposed, which will be clear from a comparison of curves $f$ and $r$ in Fig. 9. Moreover, this circuit arrangement has the advantage that polyphase alternating currents may flow in the Y- connected circuits of the winding to damp out the backward rotating component of single-phase armature reaction in single-phase alternating current dynamo-electric machines. Taking into consideration the amount of excitation current required, the excitation power loss, and heating of the winding, the most advantageous pitch for this winding arrangement has been found to be between 90 and 95 per cent. Although the heating characteristics of all three types of windings are substantially the same, there is the further practical gain of an improved space factor in the arrangements shown in Figs. 1 and 4 over the arrangement shown in Fig. 7, because the cross section of the winding is twice as great in the former winding arrangements for the same value of voltage.

In the above described winding arrangements the defining equation for each type of winding has given a definite relation between the number of short-circuited coils and the coil pitch. When the number of short-circuited coils and coil pitch are allowed to vary independently, certain general characteristics are obtained applicable to all possible types of my improved winding arrangement. These general characteristics are as follows: (1) The heating of a winding is lowest with a minimum number of short-circuited coils. (2) For any value of coil pitch the excitation power loss decreases as the number of short-circuited coils increases to reach a minimum loss, and a further increase of short-circuited coils increases the loss. (3) For any given number of short-circuited coils there is a minimum excitation power loss with a coil pitch of unity. A unity pitch is not desirable, however, because of the presence of certain harmonics in the magnetomotive force wave.

From a study of the above general characteristics it is thus possible to choose the coil pitch and number of short-circuited coils which will give the most efficient winding arrangement in any particular case.

While I have shown and described particular embodiments of my improved winding arrangement, it will be obvious to those skilled in the art that changes and modifications may be made without departing from my invention, and I, therefore, aim in the following claims to cover all such changes and modifications as fall within the true spirit and scope of my invention.

What I claim as new and desire to secure by Letters Patent of the United States is:

1. A field winding for dynamo-electric machines including a multiple layer fractional pitch distributed winding connected to produce a substantially sinusoidal magnetomotive force wave, and means including a short-circuited coil of said winding for preventing opposing magnetomotive forces in said winding.

2. A multiple layer distributed field winding for dynamo-electric machines including a slotted magnetic member, and a number of similar coils having a fractional pitch arranged in said slots and connected to produce a substantially sinusoidal magnetomotive force wave, and means including a short-circuited coil of said winding for preventing opposing magnetomotive forces between the coil sides of said winding in the same slot.

3. A multiple layer distributed field winding including a slotted magnetic member, and a number of similar coils having a fractional pitch arranged in said slots and connected in series to form a group of coils for each pole pitch of said winding, said groups of coils being connected to produce a substantially sinusoidal magnetomotive force wave, and means including a short-circuited coil of said winding for preventing opposing magnetomotive forces between the coil sides of said winding in the same slot.

4. A multiple layer distributed field winding including a slotted magnetic member, and a number of similar coils having a fractional pitch arranged in said slots and connected in series to form a group of coils for each pole pitch of said winding, said groups of coils being connected to produce a substantially sinusoidal magnetomotive force wave, and means including short-circuited coils of said winding for preventing opposing magnetomotive forces between any of the coil sides of said winding in the same slot.

5. A multiple layer distributed field winding for dynamo-electric machines including a slotted magnetic member, and a number of similar coils having a fractional pitch arranged in said slots and connected in series to form a group of circuits for each pole pitch of said winding, each group of said circuits being Y-connected and one of said groups of circuits being divided into two parallel circuits so that all of said coils will carry the same amount of current, said groups of circuits being connected to produce a substantially sinusoidal magnetomotive force wave, and means including a short-circuited coil of said winding for preventing opposing magnetomotive forces in said winding.

LLOYD P. SHILDNECK.